(Model.)

C. N. SWIFT.
TOBACCO MOISTENING PAD.

No. 290,140. Patented Dec. 11, 1883.

WITNESSES:
John R. Deemer
C. Sedgwick

INVENTOR:
C. N. Swift
BY Munn & Co
ATTORNEYS.

UNITED STATES PATENT OFFICE.

CHARLES N. SWIFT, OF NEW YORK, N. Y.

TOBACCO-MOISTENING PAD.

SPECIFICATION forming part of Letters Patent No. 290,140, dated December 11, 1883.

Application filed March 22, 1883. (Model.)

*To all whom it may concern:*

Be it known that I, CHARLES N. SWIFT, of the city, county, and State of New York, have invented a new and Improved Moistening-Pad for Tobacco and other Articles, of which the following is a full, clear, and exact description.

The invention consists in a pad formed of some bibulous substance covered by a perforated plate, and supported on a plate folded at the edges over both the bibulous substance and the perforated plate, as hereinafter described, and pointed out in the claim.

Reference is to be had to the accompanying drawings, forming part of this specification, in which similar letters of reference indicate corresponding parts in all the figures.

Figure 1:
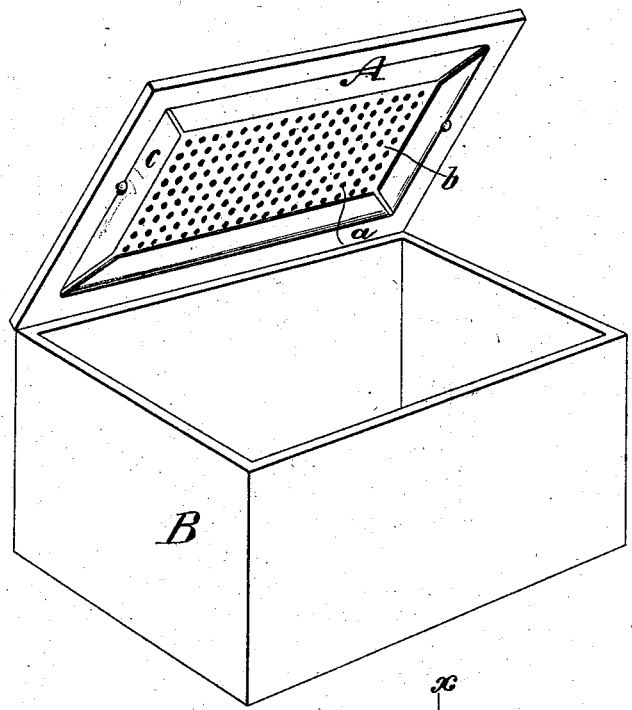
Figure 2:
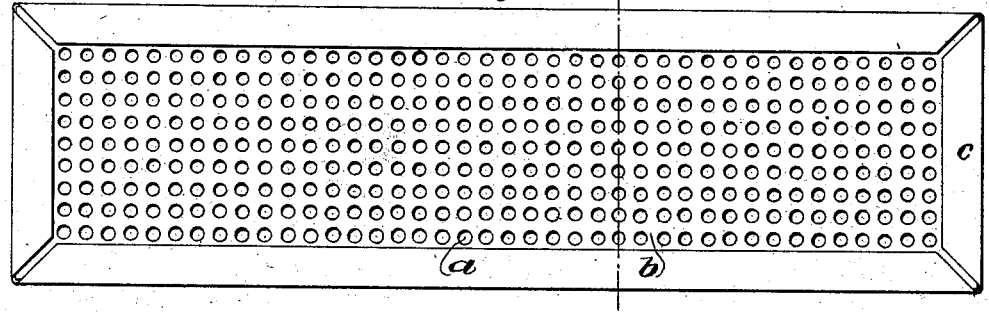
Figure 3:
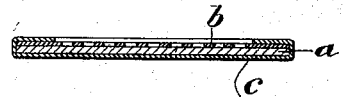

Figure 1 is a perspective view, showing my new moistening-pad applied to a cigar-box. Fig. 2 is a plan view of the pad; and Fig. 3 is a transverse sectional elevation of the same, taken on the line $x\,x$ of Fig. 2.

A represents the pad, which may be made of any suitable size, according to the purpose for which it is intended, and is made flat and thin, so that it is adapted to be simply placed loosely in the box B or other case without removing any of the contents of the box or case. If preferred, however, in small boxes or cases—such as cigar-boxes and the like—that have covers, the pad may, for convenience, be secured by small tacks or otherwise to the inside of the cover, as shown in Fig. 1.

The pad A is composed of the sheet or layer $a$, of some bibulous substance—blotting-paper preferred—the perforated plate $b$, and the casing $c$. The perforated plate $b$ is simply a piece of perforated sheet metal, though celluloid, hard rubber, or other suitable material might be used. The casing $c$ is formed by taking a piece of sheet metal (tin preferred) of the proper size and cutting triangular pieces from the corners thereof, so that its edges may be folded over the edges of the perforated plate $b$ and sheet $a$ of bibulous substance. In this manner the bibulous substance is entirely inclosed, so that it cannot come in contact with the articles packed in the box, and yet a free circulation of air is admitted to and from the bibulous substance.

In use the pad is simply to be dropped in water or other liquid until the bibulous substance becomes saturated, and then placed in the box or case the contents of which it may be desired to keep moist.

The casing $c$, instead of being made of continuous sheet metal, might also be perforated, if desired; but the plan shown is preferred, since the evaporation of the moisture from the bibulous substance is somewhat retarded by the solid back, which is necessary to prevent the substance packed in the box or case from becoming too moist, and to cause the moisture to be retained by the bibulous substance a suitable length of time.

Constructed in this manner, it will be seen that the pad is perfectly practical for its purpose, requires very little attention for its proper use, may be put at any part of any packing-case, and that there is no danger of any of the contents of the box getting damaged from contact with the substance $a$, and that it occupies very small space in the packing box or case.

I am aware that it is not broadly new to use a moistening-pad in a cigar-case or a tobacco-box; but What I do claim as new and of my invention is—

The pad A, formed of the bibulous substance $a$, covered by the perforated plate $b$, and supported on a plate, $c$, folded at the edges over both the parts $a\,b$, as shown and described.

CHARLES N. SWIFT.

Witnesses:
H. A. WEST,
C. SEDGWICK.